United States Patent
Qi et al.

(10) Patent No.: US 7,272,514 B2
(45) Date of Patent: Sep. 18, 2007

(54) PROTECTION SYSTEM FOR AN ELECTRICAL POWER GENERATOR

(75) Inventors: Wei Wei Qi, New Berlin, WI (US); Michael Rubbo, Muskego, WI (US); Richard Wainwright, Grand Rapids, MI (US)

(73) Assignee: Hamilton Sundstrand Corporation, Rockford, IL (US)

( * ) Notice: Subject to any disclaimer, the term of this patent is extended or adjusted under 35 U.S.C. 154(b) by 105 days.

(21) Appl. No.: 11/155,201

(22) Filed: Jun. 17, 2005

(65) Prior Publication Data

US 2006/0287838 A1 Dec. 21, 2006

(51) Int. Cl.
*G06F 3/01* (2006.01)

(52) U.S. Cl. .......................... 702/57; 702/56; 702/60; 702/65

(58) Field of Classification Search ................ 702/33, 702/45, 56, 104, 177, 183, 185, 57, 60, 62, 702/65; 290/40 R; 322/15; 700/30; 324/207, 324/260; 361/52, 53
See application file for complete search history.

(56) References Cited

U.S. PATENT DOCUMENTS

| | | | |
|---|---|---|---|
| 3,891,915 A * | 6/1975 | Yannone et al. ............... 322/15 |
| 4,280,060 A * | 7/1981 | Kure-Jensen et al. ..... 290/40 R |
| 4,536,126 A * | 8/1985 | Reuther ..................... 290/40 R |
| 4,749,944 A | 6/1988 | Okamoto ..................... 324/772 |
| 5,285,147 A | 2/1994 | Rashid ......................... 322/28 |
| 5,929,612 A | 7/1999 | Eisenhaure et al. ........... 322/47 |
| 6,034,855 A * | 3/2000 | Bishop ......................... 361/58 |
| 6,586,914 B2 | 7/2003 | Garrigan et al. .............. 322/28 |
| 6,587,737 B2 * | 7/2003 | Voser et al. ................... 700/30 |
| 7,042,210 B2 * | 5/2006 | Matsukawa et al. ... 324/207.25 |
| 2005/0116814 A1 | 6/2005 | Rodgers et al. |

FOREIGN PATENT DOCUMENTS

WO WO 00/13287 3/2000

* cited by examiner

*Primary Examiner*—Marc S. Huff
*Assistant Examiner*—Felix Suarez
(74) *Attorney, Agent, or Firm*—Kinney & Lange, PA

(57) ABSTRACT

An electrical power generator is characterized by a plurality of system parameters. The generator includes a controller for protecting the generator. The controller obtains data from which a present operating point of the generator and a power generating capacity of the generator can be determined. The controller further monitors data indicative of at least one system parameter as a function of time to detect an abnormality in a value of the system parameter. The controller then categorizes a type of event that caused the abnormality with respect to the data indicative of the system parameter as a function of time, the present operating point, and the power generating capacity. Finally, the controller provides a response for addressing the type of event that caused the abnormality.

17 Claims, 2 Drawing Sheets

PROTECTION SYSTEM FOR AN ELECTRICAL POWER GENERATOR

CROSS-REFERENCE TO RELATED APPLICATIONS

Reference is hereby made to co-pending U.S. patent application Ser. No. 11/156,216 filed on even date herewith and entitled "Power Manager for an Electrical Power Generator" of Wei Wei Qi, Michael Rubbo, and Richard Wainwright. This application is hereby incorporated by reference as set forth fully herein.

BACKGROUND OF THE INVENTION

The present invention relates generally to electrical power generation systems, and more particularly a self-monitoring system and method for protecting an electrical power generator by identifying, preventing, and/or correcting system faults that occur.

Electrical generators are used in a wide variety of dedicated electrical system applications and locations that require power independent of a standard electrical grid. Commonly, electrical generators are the primary, if not only, source of electrical power on a vehicle or ship, or in a remote location such as on an oil platform, in a small town, on an island or along a pipeline. Electrical generators are also commonly used as a backup power source in locations operating primarily off the standard electrical grid.

Because of this primary role served by electrical generators, it is often desired to keep the generator fully functioning, or at least partially functioning, in all circumstances. Maintaining the generator at full capacity is complicated by the fact that the conventional generator is a slave to its loads, the maximum sum of which may greatly exceed a rated capacity of the generator. The generator itself cannot directly control its outputted power; it can only control its own output voltage. Rather, it is the generator's loads that control the draw of power from the generator.

To avoid operational conditions that may harm the generator, conventional generator protection strategies dictate that the generator simply be shut off upon the detection of any abnormalities. While effective in protecting the generator, this solution is far from ideal as the generator is often the only energy source for the loads and it can take some time to restart the generator.

In detecting and identifying abnormalities that will trigger a hard shut down of the generator, conventional protection strategies monitor temperature, output voltage, output current, and/or output power of the generator for values in excess of some predetermined threshold. Such detection strategies are generally designed to maintain the generator operations well within some predetermined margins, that is, to keep the generator far away from any operating conditions where it might become unstable, or where an overtemperature or overcurrent might be experienced. These strategies, however, have the unwelcome effect of significantly limiting the effective power capacity of the generator.

Generators typically have a rated continuous capacity that is determined as the maximum quantity of power the generator can produce for an indefinite amount of time without risking damage to the generator. Generators also have a rated surge capacity determined as a value the generator can sustain for a limited time, such as when the generator experiences a surge in power demands due to the transitioning of the generator's loads between on and off states. These rated continuous and surge capacities are typically very conservative estimates of what the generator can actually handle. By conservatively maintaining the generator within these artificial boundaries, conventional protection strategies are unnecessarily sacrificing a significant capacity of the generator.

Thus, a need exists for protection strategies that protect the generator and its loads, while avoiding unnecessary generator shut downs and undue constraints on the generator's capacity.

BRIEF SUMMARY OF THE INVENTION

The present invention introduces protection strategies for an electrical power generator that protect the generator from harm while not unnecessarily limiting the power generating capacity of the generator. An electrical power generator is characterized by a plurality of system parameters. The generator includes a controller for protecting the generator. The controller obtains data from which a present operating point of the generator and a power generating capacity of the generator can be determined. The controller further monitors data indicative of at least one system parameter as a function of time to detect an abnormality in a value of the system parameter. The controller then categorizes a type of event that caused the abnormality with respect to the data indicative of the system parameter as a function of time, the present operating point, and the power generating capacity. Finally, the controller provides a response for addressing the type of event that caused the abnormality.

DETAILED DESCRIPTION

The present invention introduces protection strategies for an electrical power generator that protect the generator from harm while not unnecessarily limiting the power generating capacity of the generator. Such protection strategies are particularly beneficial in protecting the generator disclosed in commonly-owned co-pending U.S. patent application Ser. No. 11/156,216 referenced above, which is designed to operate across its full spectrum of power capacities. Nonetheless, these strategies may be useful in protecting any electrical power generator from harm.

Figure 1:
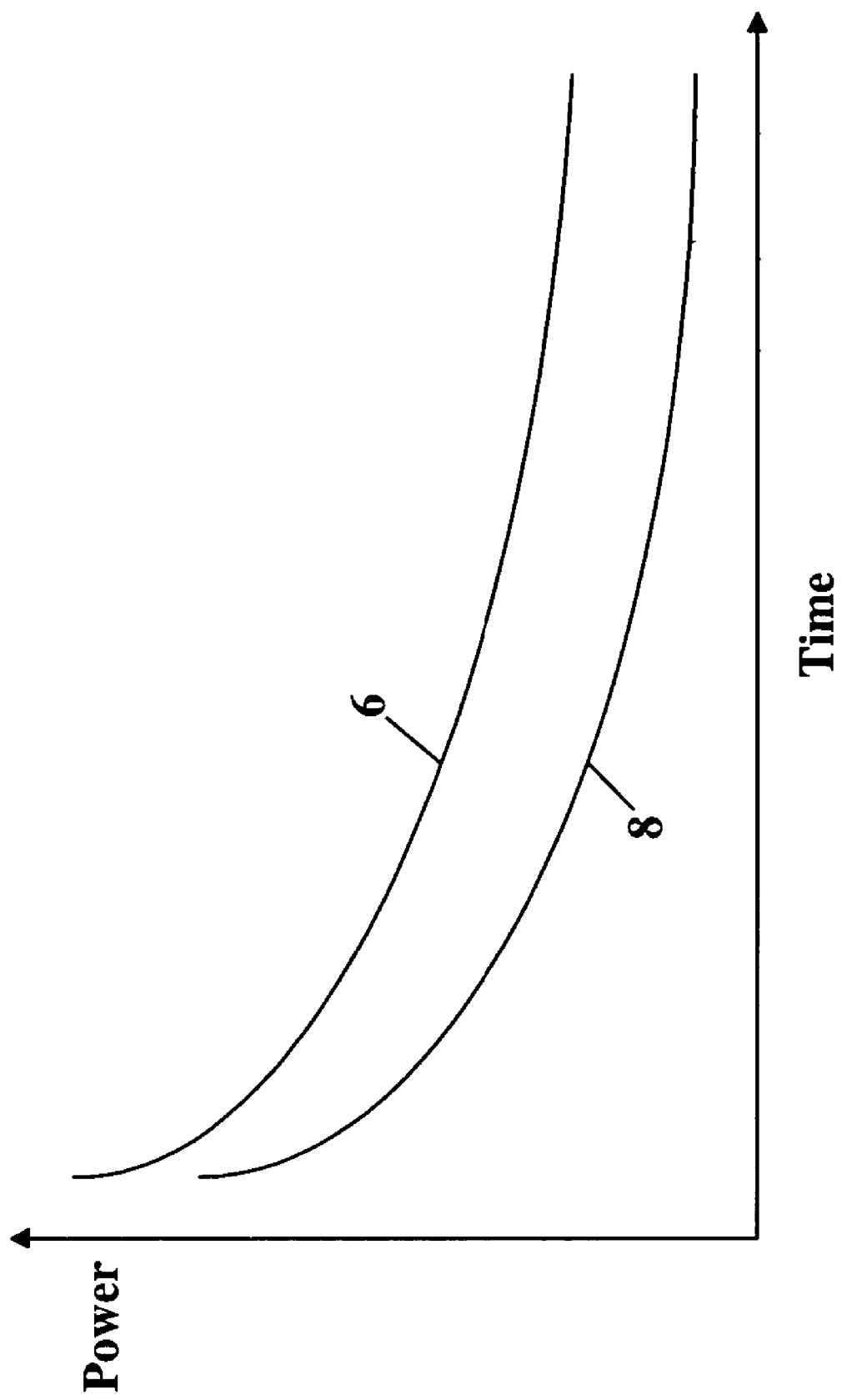
FIG. 1 is a graph of two power time relationships of a typical generator for illustrating a full capacity of the generator.

FIG. 1 is a graph illustrating power-time relationships 6 and 8 of a typical generator for illustrating a power generating capacity of the generator. FIG. 1 plots a quantity of power produced by a generator as a function of time that the generator can sustain production of that quantity of power without risking damage to itself given existing system parameters of the generator. These parameters may include ambient temperature, a temperature of various components of the generator, a rotational speed of the generator, and a frequency of the generator output. As the system parameters change, so too does the capacity of the generator. For example, as the generator's ambient temperature increases, the power capacity of the generator decreases. Thus, power-time relationships 6 and 8, shown in FIG. 1 exist for different system parameters, with power-time relationship 6 illustrating a capacity of the generator for a first set of system parameters (e.g., a low ambient temperature) and power-time relationship 8 illustrating the generator's capacity for a second set of system parameters (e.g., a high ambient temperature).

As shown in FIG. 1, the typical generator can produce a relatively high quantity of power; however, it can sustain this quantity for only a very short period of time. As the produced quantity of power decreases, the length of time that the generator can sustain this production increases. Eventually, the sustainable power levels off at a steady state value.

A rated continuous capacity and a rated surge capacity of a conventional generator are generally conservatively drawn from these power-time characteristics of the generator. That is, these rated values are typically determined from the generator's power-time relationship corresponding to a worse case scenario. The rated continuous capacity is generally determined as the steady-state value of the worse case scenario power-time relationship, while the rated surge capacity is determined as a multiple of the continuous capacity. The rated surge capacity may in fact be less than the actual maximum power the generator can produce.

Figure 2:
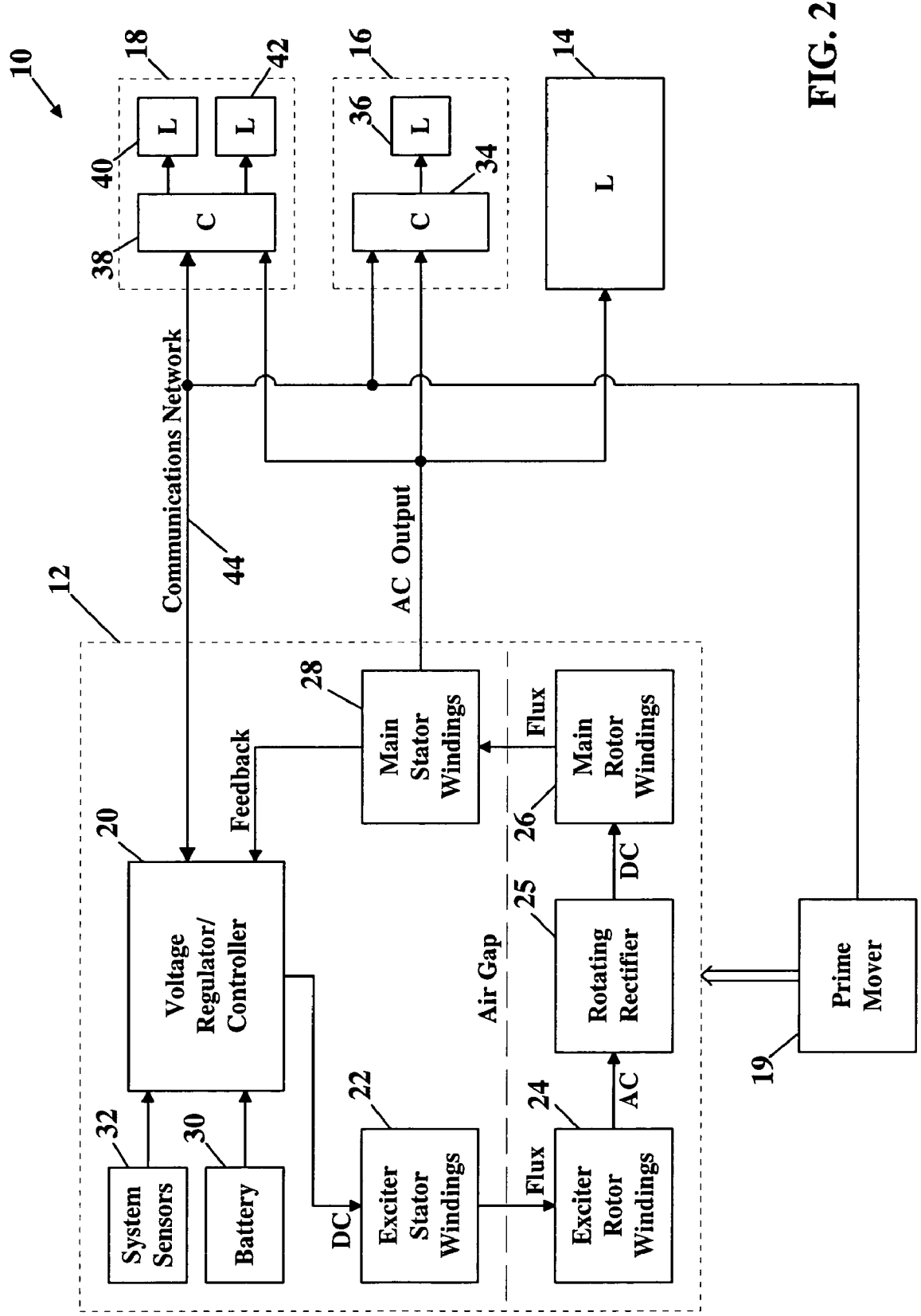
FIG. 2 is block diagram of an electrical system in accord with the present invention.

The present invention enables the generator to produce power over its full range of capacities, rather than simply limiting the generator to its rated continuous capacity. FIG. 2 is a block diagram of electrical system 10 in accord with the present invention. Electrical system 10 includes electrical power generator 12 for supplying power to any of a plurality of different types of loads. For illustrative purposes only, generator 12 is shown in FIG. 2 with three loads 14, 16, and 18.

As shown in FIG. 2, generator 12 is a brushless generator that converts the rotational energy generated by prime mover 19 into a multiphase alternating current (AC). The present invention, however, is not limited to only brushless generators, and other types of generators may be substituted for brushless generator 12. As is conventionally known, brushless generator 12 includes voltage regulator (or controller or processor) 20, an exciter having stator field windings 22 and rotor field windings 24, rotating rectifier 25, and a main generator having rotor field windings 26 and stator field windings 28. Exciter rotor field windings 24, rotating rectifier 25, and main generator field windings 26 share a rotor and are separated by an air gap from the stator having exciter stator field windings 22 and main generator stator field windings 28.

The conventional power generating operations of generator 12 are well known. In operation, voltage regulator 20 receives a direct current (DC) voltage from battery 30. Alternatively, battery 30 could be replaced with a permanent magnet generator or another source of DC voltage. Voltage regulator 20 supplies a first DC voltage to exciter stator field windings 22, which in turn develop a magnetic field. Exciter rotor field windings 24 are rotated in this magnetic field to produce a first multiphase AC voltage. The first AC voltage is then supplied to rotating rectifier 25, which rectifies the first AC voltage into a second DC voltage for supply to main generator rotor field windings 26. The current in main generator rotor field windings then generates a magnetic field which in turn produces a multiphase AC power at an output of main generator stator windings 28. This AC power is supplied to loads 14, 16, and 18 of generator 12, and also as feedback to voltage regulator 20.

Voltage regulator 20 uses this feedback to help maintain a constant voltage at the output of generator 12, which may otherwise vary due to factors such as a variable rotational speed of the rotor of generator 12. Voltage regulator 20 accomplishes this goal by measuring the output voltage of generator 12 and adjusting a current provided to exciter stator windings 22 as needed in a closed-loop fashion.

Voltage regulator 20 further includes software for implementing the generator protection strategies of the present invention. In essence, these strategies improve upon the prior art because they minimize the use of "hard limits" in detecting faults. Rather, voltage regulator 20 is aware at any time of the present operating point of generator 12 (i.e., what generator 12 is presently doing) and of the power generating capacity of generator 12 (i.e., what generator 12 can do), and processes this information to intelligently assess whether or not a change in system parameters is harmful.

To gain an awareness of its own operating conditions, voltage regulator 20 has the ability to capture data about its own operating parameters. For this purpose, generator 12 includes system sensors 32 for sensing and/or measuring a plurality of system parameters related to the operation of generator 12, such as the voltage provided at its output, the current drawn from its output, ambient temperature, the temperature of its stator, the temperature of its rotor, the power produced by its exciter, the rotational speed of its rotor, the frequency of its output signal, and/or system time. System sensors 32 may include hardware and/or software that may be contained in a single device or multiple devices for sensing, measuring, or otherwise determining these various system parameters. Further, system sensors 32 may be implemented in any of a plurality of conventional methods. Data indicative of these system parameters is then supplied to voltage regulator 20.

The amount of time generator 12 has been performing at a particular operating point is another system parameter that voltage regulator 20 may use. As described above, high power outputs can be sustained for only a limited time period. Thus, generator 12 may include software and/or hardware for monitoring the length of time generator 12 has supplied a power outside of its rated continuous capacity.

Essentially, voltage regulator 20 evaluates these system parameters to determine which power-time curve best corresponds to the present operating point and where on that curve the present operating point falls. From this information, voltage regulator 20 can determine the present power capacity of generator 12. This power capacity is the maximum power generator 12 can produce based upon the present value of the system parameters. The power capacity of generator 12 may be greater than, less than, or the same as the present power being supplied; but importantly, it may exceed the rated continuous capability of generator 12. For example, generator 12 will be able to produce more power on a cold day with prime mover 19 operating at high speeds than on a hot day with its prime mover 19 operating at a low speed.

Once voltage generator 12 is aware of its present operating point and its power generating capability, it can better analyze the system parameters to identify true system faults. In one protection strategy, voltage regulator 20 monitors at least one of output voltage, output current, output power, and/or a suitable proxy (e.g., the product of the measured output voltage and the measured output current could be a proxy for output power) for any of the above to monitor for the occurrence of surges in current or voltage, overloads, and overcurrents. Rather than just evaluating whether these values have exceeded some predetermined threshold, voltage regulator 20 evaluates, or maps, each parameter over time to take note of any trends such as how quickly the changes are occurring and how long they are lasting. This information, combined with the present operating point and the power generating capacity of generator 12, gives voltage regulator 20 the intelligence it needs to identify whether a changed system parameter is the result of a normal event, a transient event caused by the loads transitioning between on and off states, a significant event such as a permissible overload, or a true fault that will likely harm-generator 12 if allowed to continue.

If the event is a normal or transient event, no further action is required of voltage regulator 20. Conversely, if the event is a system fault, voltage regulator 20 will act quickly to prevent injury to generator 12 by either causing a reduction in the output power (such as by causing a reduction in the output voltage) or by simply shutting generator 12 off. Finally, if the event is a significant event, voltage regulator 20 will begin monitoring the event. A significant event is generally caused by a power demand at the output of generator 12 that exceeds the rated continuous capability of generator 12. As discussed above, generator 12 can safely provide power at these higher values, but it can sustain it for only a limited time period, where that time period is affected by the present operating point and the power capacity of generator 12. Thus, voltage regulator 20 will monitor the event to ensure that it does not become a true fault.

One way in which voltage regulator 20 can reduce the output power is through communication with any intelligent loads (i.e., loads having their own controller for controlling their power consumption) of generator 12. In the embodiment illustrated in FIG. 2, electrical system 10 includes intelligent loads 16 and 18 communicably coupled to voltage regulator 20 and each other via communications network 44. Load 16 includes load controller 34 and its load 36, while load 18 includes load controller 38 and its two associated loads 40 and 42. Communications network 44 may be implemented with any communications protocol. For example, communications network 44 may be implemented with a controller area network (CAN), which is one of the ISO standard communications protocols.

By providing communication between voltage regulator 20 and intelligent loads 16 and 18, voltage regulator 20 can request that loads 16 and 18 change their behavior (i.e., their power consumption) to help avoid any true system faults. Thus, if generator 12 is monitoring a significant event and recognizes that it may soon become a system fault, voltage regulator 20 may send a request to loads 16 and 18 to reduce their power consumption, thus preventing the occurrence of a system fault.

A second protection strategy of the present invention provides for thermal protection of generator 12. Conventional thermal protection strategies simply involve a basic threshold inquiry: "Has the measured temperature exceeded the threshold temperature?" One problem with such threshold determinations is the slow response time of temperature sensors forces a slow response to the condition that caused the high temperatures. Further, threshold determinations do not allow for the fact that generator 12 may be able to tolerate some high temperatures for a limited period, and instead may unnecessarily force a shut down of generator 12.

For providing thermal protection, system sensors 32 may include sensors for measuring ambient temperature, stator temperature, and/or rotor temperature. Further, voltage regulator 20 may evaluate a proxy for any of these temperature measurements. For example, actual rotor temperature is a difficult measurement to obtain; but, because the square of the current in the rotor windings is proportional to the rotor temperature, this value can serve as proxy for rotor temperature.

In monitoring for thermal faults, voltage regulator 20 may evaluate, or map, temperature as a function of time to take note of any trends such as how quickly the changes are occurring and how long they are lasting. Here, voltage regulator 20 may consider absolute, or measured, temperature and/or the difference between absolute temperature and ambient temperature. By evaluating this temperature data with respect to time in combination with the present operating point and the power generating capacity of generator 12, voltage regulator 20 has the intelligence it needs to identify whether a change in temperature is the result of either a normal or a transient thermal event requiring no action, a significant thermal event requiring further monitoring, or a true thermal fault requiring a rapid response.

In monitoring for thermal faults, voltage regulator 20 may also consider the rate of change in the temperature over time. If the temperature is increasing too rapidly, voltage regulator 20 can assume that a thermal fault is inevitable and take rapid action to prevent its occurrence. Here, it may be preferred to evaluate a temperature difference rather than just an absolute temperature. By subtracting ambient temperature over time from the absolute temperature over time, it is possible to consider more directly the system cause of the temperature increase.

A third protection strategy relates to the stability of the output power of generator 12. For protecting against output power instability, voltage regulator 20 measures a time-based fluctuation in the output voltage, which it then compares to expected values in the system. This expected value is not just a simple threshold value, but is determined based on the present operating point of generator 12. From this comparison, voltage regulator 20 can determine if this instability is tolerable or if it requires attention to cause a reduction in the power at the output of generator 12. Again, this reduction can be caused by reducing the output voltage or by requesting that intelligent loads 16 and 18 reduce their consumption.

This protection strategy is particular useful for the generator described in commonly-owned, co-pending U.S. patent application Ser. No. 11/156,216 filed on even-date herewith. That application, which has FIG. 2 in common with the present application, teaches that generator 12 cooperates with intelligent loads 16 and 18 to safely utilize the full power capacity of generator 12. According to the invention of that application, voltage regulator 20 provides over communications network 44 data indicative of the present output power and power capacity of generator 12 to intelligent loads 16 and 18 for use by loads 16 and 18 in determining their own power consumption.

Due to delays in communications network 44, this scenario presents an unusual opportunity for the development of output power instability. Assume that voltage regulator 20 communicates to loads 16 and 18 via communications network 44 that additional power is available for their consumption, but an event occurs shortly after that communication that reduces the power capacity of generator 12. This new power capacity is communicated to loads 16 and 18, but due to the delay of communications network 44, loads 16 and 18 may both increase their consumption prior to receiving the second communication. When they receive the second communication, loads 16 and 18 will likely reduce their consumption. This could in turn trigger voltage regulator 20 to communicate an increase in power capability, and thus begins the see-saw effect leading to power instability. Voltage regulator 20, by monitoring for instability, can identify this scenario, and other scenarios that lead to instability, to reduce both power output and power capacity until the output of generator 12 settles down.

A fourth protection strategy of the present invention protects against line-to-line short circuits. To implement this strategy, system sensors 32 include circuitry to half-wave rectify the voltages of each phase at the output of generator 12. Here, voltage regulator 20 compares the measured (rectified) voltages to expected voltages for the present operating frequency of generator 12 to predict a line-to-line short circuit. This simple solution involves relatively low cost devices and provides voltage regulator 20 with sufficient time to react to this short circuit event before the actual short circuit occurs.

Although the present invention has been described with reference to preferred embodiments, workers skilled in the art will recognize that changes may be made in form and detail without departing from the spirit and scope of the invention.

The invention claimed is:

1. A method for protecting an electrical power generator having an electrical performance characterized by a plurality of system parameters, the method comprising:
    obtaining data from which both a present operating point of the generator and a power generating capacity of the generator can be determined;
    monitoring data indicative of at least one system parameter as a function of time to detect an abnormality in a value of the system parameter;
    categorizing a type of event that caused the abnormality with respect to the data indicative of the system parameter as a function of time, the present operating point, and the power generating capacity; and
    providing a response for addressing the type of event that caused the abnormality.

2. The method of claim 1 wherein the plurality of system parameters comprise at least two parameters selected from the group consisting of generator output power, generator output voltage, generator output current, ambient temperature, stator temperature, and rotor temperature, rotational speed of the generator, and frequency of the generator output.

3. The method of claim 1 wherein the type of event comprises at least one of a normal event, a transient event, a significant event, and a fault event.

4. The method of claim 3 wherein providing a response for addressing the type event that caused the abnormality comprises:
    monitoring for expiration of a time period if the event is categorized as a significant event; and
    causing a reduction in an output power of the generator upon a determination that the electrical performance of the generator has not improved prior to expiration of the time period.

5. The method of claim 3 wherein providing a response for addressing the type of event that caused the abnormality comprises:
    causing a reduction in an output power of the generator if the event is categorized as one of a significant event and a fault event.

6. The method of claim 5 wherein causing a reduction in an output power of the generator comprises causing a reduction in the output voltage of the generator.

7. The method of claim 5 and further comprising:
    causing the generator to shut off upon a determination that the reduction in output power has not improved the electrical performance of the generator.

8. An electrical system comprising:
    an electrical power generator;
    a plurality of system sensors that sense a plurality of system parameters characterizing an electrical performance of the generator; and
    a generator controller coupled to the plurality of system sensors for receipt of data indicative of the plurality of system parameters from which the generator controller determines a present operating point of the generator and a power generating capacity of the generator, wherein the generator controller:
        (i) monitors data indicative of at least one system parameter as a function of time to detect an abnormality in a value of the system parameter;
        (ii) categorizes a type of event that caused the abnormality with respect to the data indicative of the system parameter as a function of time, the present operating point, and the power generating capacity; and
        (iii) provides a response for addressing the type of event that caused the abnormality.

9. The electrical system of claim 8 and further comprising:
    at least one intelligent, variable load having a load controller associated therewith, the load receiving power from the generator; and
    a communications network communicably coupling the generator controller to the load controller.

10. The electrical system of claim 9 wherein the plurality of system parameters comprise at least two parameters selected from the group consisting of generator output power, generator output voltage, generator output current, ambient temperature, stator temperature, and rotor temperature, rotational speed of the generator, and frequency of the generator output.

11. The electrical system of claim 9 wherein the type of event comprises at least one of a normal event, a transient event, a significant event, and a fault event.

12. The electrical system of claim 11 wherein if the event is categorized as a significant event, the generator controller monitors for expiration of a time period and causes a reduction in an output power of the generator upon a determination that the electrical performance of the generator has not improved prior to expiration of the time period.

13. The electrical system of claim 11 wherein if the event is categorized as one of a significant event and a fault event, the generator controller provides causes a reduction in an output power of the generator.

14. The electrical system of claim 13 wherein the generator controller causes a reduction in the output voltage of the generator.

15. The electrical system of claim 13 wherein the generator controller transmits a request to the load controller associated with at least one of the intelligent loads to reduce a power consumption of its load.

16. The electrical system of claim 15 wherein the load controller of each intelligent load is responsive to requests from the generator controller to reduce consumption.

17. The electrical system of claim 15 where in the generator controller causes the generator to shut off if it determines that the load controller has not reduced the power consumption of its load.

* * * * *